May 11, 1937. H. J. BRANDENBURG 2,080,198
FRUIT BRUSHER
Filed Feb. 9, 1935
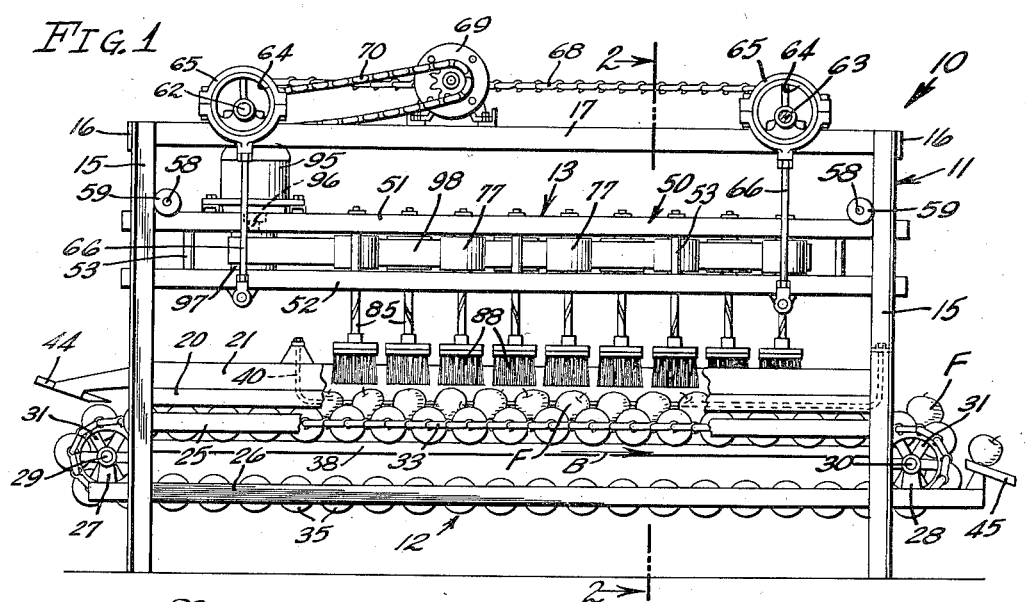
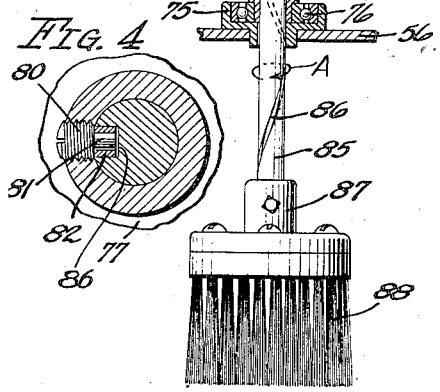
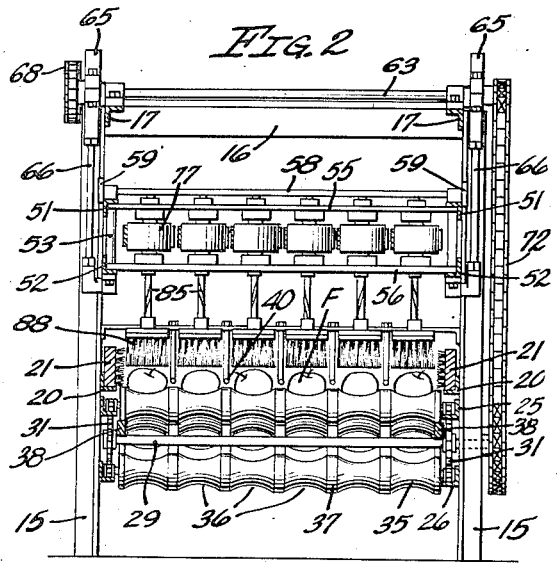
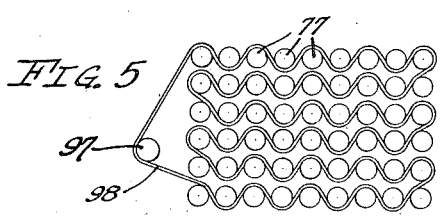
INVENTOR
HARRY J. BRANDENBURG.
BY
ATTORNEY Patented May 11, 1937

2,080,198

UNITED STATES PATENT OFFICE 2,080,198

FRUIT BRUSHER

Harry J. Brandenburg, Glendora, Calif., assignor of fifty-five per cent to F. E. Wood, W. G. Cartter, J. B. Seem, and W. J. Bailey, Monrovia, Calif.

Application February 9, 1935, Serial No. 5,749

13 Claims. (Cl. 146—202)

My invention relates to the preparation of agricultural produce for market and more particularly to a machine for washing, polishing or otherwise treating fruits such as oranges, apples, etc.

Particular care must be exercised in washing these fruits in order to thoroughly clean the somewhat inaccessible depressions at the stem and blossom ends thereof. It is also necessary that fruits having scaly surfaces be thoroughly scrubbed to remove the scale therefrom. The fruit washing machines in use at present do not effectively clean very dirty or scaly fruit, particularly the inaccessible portions referred to.

An object of my invention is to provide a machine that will thoroughly clean fruit regardless of how dirty or scaly the fruit may be.

Another object of my invention is the provision of a fruit washer in which a uniform pressure is exerted by the brushing surfaces on the fruit regardless of the variation in size of the pieces of fruit.

A further object of my invention is to provide a washer in which the fruit is continually rolled so as to present the entire surface of each piece of fruit to the brushing surface.

Further objects and advantages will be made manifest in the following description, taken in connection with the accompanying drawing, in which:

Fig. 1 is a side elevational view of a preferred embodiment of my invention, certain portions thereof being broken away to more clearly disclose the structure.

Fig. 2 is a vertical, transverse sectional view taken on the line 2—2 of Fig. 1.

Fig. 3 is an enlarged vertical sectional view of one of the brushes included in my invention.

Fig. 4 is an enlarged cross-sectional view taken on the line 4—4 of Fig. 3.

Fig. 5 is a diagrammatic plan view showing the manner in which the brushes of the machine of my invention are driven.

Referring specifically to the drawing, a fruit brushing machine 10 comprising a preferred embodiment of my invention is shown in Fig. 1, this machine including a frame 11, a conveyor 12 and a brushing unit 13.

The frame 11 includes four vertical, angle iron corner posts 15, these being joined at their upper ends by transverse bars 16 and longitudinal angle bars 17. Provided at each side of the machine 10 are horizontal angle bars 20 the latter supporting brushes 21 which extend the full length of the machine 10.

The conveyor 12 includes a pair of upper and lower angle bars 25 and 26 respectively the bars 26 extending beyond the ends of the frame 11 as shown in Fig. 1. Mounted on opposite ends of the bars 26 are pairs of aligned bearings 27 and 28 in which shafts 29 and 30 are journalled. Fixed on each of the shafts 29 and 30 are pairs of sprockets 31 about which conveyor chains 33 are trained. As shown in Figs. 1 and 2 the upper and lower flights of the chains 33 are supported by the angle bars 25 and 26 respectively. Carried by the chains 33 are closely spaced rotatable rollers 35, portions of which are reduced in diameter as shown in Fig. 2 to provide annular necks 36 and ridges 37. Fixed on the frame 11 and rollably supporting the rollers 35 when these are disposed between the upper flights of the chains 33 are tracks 38. Suspended over the conveyor 12 as shown in Figs. 1 and 2 is a plurality of parallel rods 40, each of these being positioned close to the rollers 35 in vertical alignment with the ridges 37. Suitably mounted at opposite ends of the conveyor 12 are intake and outlet drop boards 44 and 45 respectively.

The brushing unit 13 includes a frame 50 having upper and lower angle iron bars 51 and 52 these being held in spaced relation by spacers 53. Fixed at their opposite ends to the upper angle irons 51 are horizontal bars 55, similar bars 56 being supported by the angle irons 52, the bars 55 and 56 being positioned in vertical alignment. Journalled at opposite ends of the frame 50 on the angle iron bars 51 are transverse shafts 58 as shown in Figs. 1 and 2. Fixed on the ends of the shafts 58 are discs 59 positioned to contact the corner posts 15. It is thus clear that the frame 50 of the brushing unit 13 is mounted in the frame 11 of the machine 10 so as to be movable vertically. Suitably journalled on top of the frame 11 are shafts 62 and 63 having eccentrics 64 fixed on the ends thereof. Mounted on each of the eccentrics 64 is a roller 65 to which a rod 66 is fixed, the lower ends of the rods being rockably connected to the frame 50 of the brushing unit 13. Trained about suitable sprockets on the ends of the shafts 62 and 63 is a chain 68. The shaft 62 is driven by a motor 69 and chain drive 70, rotation of the shaft 62 being transmitted to the shaft 63 by means of the chain 68. The motor 69 has a built-in speed reducing mechanism so as to drive the shafts 62 and 63 at a relatively slow speed. As shown in Fig. 2 the conveyor 12 is driven from the shaft 63 by a suitable chain drive 72.

Mounted on the bars 55 and 56 of the brushing unit 13 is a plurality of pairs of vertically aligned housings 75 in which ball bearings 76 are received as shown in Fig. 3. Rotatably mounted between each pair of the bearings 76 is a pulley 77. Threaded into the hub of each of the pulleys 77 is a screw 80 formed to provide a stud 81 upon which a roller 82 is mounted as shown in Fig. 4.

Slidable vertically in the bore of each of the pulleys 77 is a spindle 85 formed to provide a spiral keyway 86. Fixed on the lower end of each of the spindles 85 is a face plate 87 on which a brush 88 is mounted. Secured on the upper ends of the spindles 85 are collars 89 for the purpose of limiting the downward movement of the spindles 85.

Supported on the frame 50 of the brushing unit 13 is a vertical motor 95 having a shaft 96 to which a pulley 97 is keyed. Trained about the motor pulley 97 and the spindle pulleys 77 is an endless belt 98 as shown in Fig. 5, it being noted that each of the pulleys 77 is driven in a direction opposite to that of the pulleys adjacent thereto.

It will be seen in Fig. 3 that when the spindle 85 is driven by pulley 77 in the direction of rotation indicated by the arrow A that contact of the roller 82 with the spiral key way 86 will, in addition to rotating the spindle 85, tend to lift the spindle. It will also be noted in Figs. 1 and 2 that the spindles 85 are provided with either right or left hand spiral key ways 86, depending upon the direction of rotation so that all of the spindles 85, while being rotated by the pulleys 77 will tend to be lifted thereby.

Operation

When the motor 69 is started the shafts 62 and 63 are rotated causing the eccentrics 64 to continually raise and lower the frame 50 of the brushing unit 13. The conveyor 12 is driven in the direction indicated by the arrow B in Fig. 1 by the chain drive 72 shown in Fig. 2. Each of the spindles 85 is driven at a relatively high speed of rotation by starting the motor 95. Pieces of fruit F to be washed are conveyed from a soaking tank (not shown) and placed on the inlet board 44 so as to roll onto the conveyor 12. Each piece of fruit F lodges between a pair of the rollers 35 in the cavities formed by the opposite neck portions 36 in the rollers 35 and is rotated by the rotation of these rollers. As the brushing unit 13 is raised by the eccentrics 64 the fruit F passes under the brushes 88 and when the unit 13 is lowered the fruit is subjected to a vigorous scrubbing action. When the brushes 88 are being lowered onto the fruit F, the spindles 85 slide within the pulleys 77 when a predetermined pressure occurs between the brushes 88 and fruit F, so regardless of the size of each piece of fruit there is no danger of injury thereto as a result of too much pressure thereon by the brush 88.

Another point to be noted is that each piece of fruit is held by the pockets formed by the rollers 35 against displacement by the brushes, the rods 40 also assisting in keeping each piece of fruit in its proper place during the brushing operation. This retention of the fruit greatly facilitates the cleaning thereof by the brushes. While being held in this manner, it is clear that each piece of fruit is continually rotated about its center while being carried along against the brushes 88 due to the rotatable mounting of the rollers 35.

It is thus evident that each piece of fruit while passing through the machine 10 has its entire surface subjected to a gentle but thorough scrubbing action.

Although I have shown and described but one preferred form of my invention it is to be understood that many modifications and changes might be made therein without departing from the spirit of the invention or the scope of the following claims.

I claim as my invention:

1. In a fruit treating machine, the combination of: a frame; a conveyor mounted on said frame for carrying pieces of fruit; a rotary treating element mounted on said frame over said conveyor and extending downwardly into contact with said fruit, said treating element being yieldable upwardly; means for rotating said treating element about a vertical axis; and means responsive to engagement between said element and said fruit to draw said treating element upwardly away from said fruit to reduce the force exerted on said fruit by said treating element.

2. In a fruit treating machine, the combination of: a frame; a conveyor mounted on said frame for carrying pieces of fruit; a rotary treating element mounted on said frame over said conveyor and extending downwardly into contact with said fruit, said treating element being yieldable upwardly; means for rotating said treating element about a vertical axis; means responsive to engagement between said element and said fruit to draw said treating element upwardly away from said fruit to reduce the force exerted on said fruit by said treating element; and means on said conveyor for retaining each piece of fruit against displacement in relation to said conveyor by said treating element.

3. A combination as in claim 1 in which power means is provided for continually and positively moving said conveyor and said treating element relatively toward and away from each other.

4. In a fruit treating machine, the combination of: a frame; a horizontal conveyor for carrying pieces of fruit; a rotatable and vertically slidable spindle mounted on said frame over said conveyor, said spindle being formed to provide a helical key way thereon; a brush on the lower end of said spindle for engaging said fruit; a driven pulley on said spindle; a key provided in the bore of said pulley to engage said helical key way, said pulley being driven in a direction of rotation to cause said key to exert a lifting force on said spindle in addition to rotating the same, said lifting force resulting from the contact of said key with the helical angularity of said key way.

5. A combination as in claim 4 in which a plurality of such brushes and mounting mechanisms are provided and transversely disposed; and means for retaining each piece of fruit against bodily displacement by one of said brushes laterally on said conveyor.

6. A combination as in claim 4 in which means is provided on said conveyor for retaining each piece of fruit against bodily displacement by said brush laterally on said conveyor.

7. In a fruit treating machine, the combination of: a horizontal conveyor including flexible endless chains and a series of rollers rotatably supported at their ends between said chains; means for causing said rollers to rotate as they travel between the upper flights of said chains; means for feeding fruit to said rollers; means for segregating and maintaining the fruit so fed in rows extending transversely of said rollers and parallel with the direction of their travel; a plurality of series of brushes rotating on vertical axes one of said series being disposed over each of said rows; means for rotating said brushes; and means causing said brushes to yield upwardly in response to inequalities of the fruit moving therebeneath.

8. A combination as in claim 7 in which means is provided for periodically reciprocating said brushes vertically with relation to said fruit during the operation of said machine.

9. In a fruit treating machine, the combination of: a frame; a horizontal conveyor including flexible endless chains and a series of rollers rotatably supported at their ends between said chains; means for causing said rollers to rotate as they travel between the upper flights of said chains; means for feeding fruit to said rollers; means on said frame for segregating and maintaining the fruit so fed in rows extending transversely of said rollers and parallel with the direction of their travel; rotary overhead brush means for scrubbing the fruit in each of said rows as it is conveyed in said direction by said rollers; and means for periodically reciprocating said brush means vertically with relation to said fruit during the operation of said machine.

10. In combination: a treating element adaptable to yieldably conform with the exterior surfaces of recesses in the stem and blossom ends of pieces of fresh whole fruit; means for mounting said treating element for rotation about a vertical axis; means for feeding pieces of fruit in single file along a pathway extending beneath said treating element and rotating said fruit as it is so fed to successively bring the stem and blossom ends thereof upwardly; and means for rotating said treating element about a vertical axis and including additional means for adjusting the height of said treating element in response to engagement of said fruit and said element to cause the latter to extend into the recesses at the stem and blossom ends of said fruit which might be disposed upwardly as such fruit is conveyed therebeneath so that said treating element extends into and frictionally engages the surfaces of said upwardly disposed recesses.

11. A combination as in claim 10 in which a plurality of said treating elements is provided and operated as defined in said claim and in which the fruit conveying means conveys said pieces of fruit successively beneath all said treating elements in the manner defined in said claim.

12. A combination as in claim 1 in which a plurality of said treating elements are provided; and means for segregating pieces of fruit travelling on said conveyor into a plurality of parallel longitudinal rows, said elements being disposed over said rows with the axes therefore intersecting said rows.

13. A combination as in claim 1 in which a plurality of said treating elements are provided; and longitudinally disposed barriers provided on said frame for segregating pieces of fruit travelling on said conveyor into a plurality of parallel longitudinal rows, said elements being disposed over said rows with the axes thereof intersecting said rows.

HARRY J. BRANDENBURG.